United States Patent [19]

Olson et al.

[11] Patent Number: 4,508,760
[45] Date of Patent: Apr. 2, 1985

[54] METHOD AND APPARATUS FOR MICROENCAPSULATION

[75] Inventors: Roger Olson, Clear Lake, Wis.; Ronald J. Versic, Dayton, Ohio

[73] Assignee: Nova Tran Corporation, Clear Lake, Mich.

[21] Appl. No.: 503,053

[22] Filed: Jun. 10, 1983

[51] Int. Cl.³ .............. B01J 13/02; B05D 5/06; B05D 5/12
[52] U.S. Cl. .............. 427/213.34; 118/716; 118/DIG. 5; 252/301.6 S; 427/70; 427/221; 427/242
[58] Field of Search ........... 427/213.34, 70, 221, 427/242; 118/716, DIG. 5; 252/301.6 S

[56] References Cited

U.S. PATENT DOCUMENTS

| | | | |
|---|---|---|---|
| 1,886,170 | 11/1932 | Cruser | 427/242 |
| 2,470,451 | 5/1949 | Wood | 252/301.6 S |
| 3,300,332 | 1/1967 | Gorham et al. | 427/213.34 X |
| 3,517,644 | 6/1970 | Baer | 118/716 |
| 3,875,449 | 4/1975 | Byler et al. | 252/301.6 S X |

FOREIGN PATENT DOCUMENTS 50-26782 3/1975 Japan ............ 427/213.32

Primary Examiner—Richard D. Lovering
Attorney, Agent, or Firm—Hill, Van Santen, Steadman & Simpson

[57] ABSTRACT

A method and apparatus for microencapsulating an electroluminescent phosphor with an extremely thin coating. The process involves vaporizing a poly-para-xylylene, pyrolyzing the resulting vapors to form reactive monomeric radicals, and then passing such vaporous radicals to a vacuum deposition zone where they contact tumbling particles of an electroluminescent phosphor under vacuum conditions. As the particles are being coated, they are sifted by means of a screen. The reactive monomeric radicals deposit on the tumbling particles, are adsorbed by the particles, and polymerized into a very thin coating on the surfaces of the particles.

8 Claims, 2 Drawing Figures

METHOD AND APPARATUS FOR MICROENCAPSULATION

BACKGROUND OF THE INVENTION

1. Field of the Invention

The present invention relates to a method and apparatus for microencapsulation of electroluminescent phosphor particles to provide protection against moisture and to improve product life expectancy.

2. Description of the Prior Art

A good review of electroluminescent devices appears in the paper entitled "Electroluminescent Lighting Applications" by Chesley S. Pieroway, which was presented to the Illuminating Engineering Society of North America, Aviation Lighting Committee, in November 1981. As explained in that paper, there are presently two basic types of electroluminescent phosphor lighting, referred to as the thin film and the thick film types. The thin film type uses a vacuum deposition procedure at about 500° to 600° F. (260° to 318° C.) to make a very thin coating on glass. This system requires a high voltage and high frequency energization, typically 900 volts and 20,000 Hertz but possesses extreme brightness. The thin film system, however, is very sensitive to power changes. It is expensive, heavy, and is available only in a limited number of colors.

The thick film device provides a phosphor thickness measured in mils and can be applied by means of a silk screen or a doctor blade on an aluminum foil. It operates on standard alternating current voltage at frequencies of 60 to 20,000 Hertz. The lamps are available in many colors at a reasonable output and are relatively inexpensive.

In recent times, there have been suggestions made for encapsulating the electroluminescent phosphors such as zinc sulfide in an attempt to prevent attack by moisture. Probably the most successful of these has been microencapsulation with urethane type polymers. These polymers are applied by a coacervation process wherein the particles to be coated are suspended in a toluene solution and cooled. A hydrolyzed ethylene acetate is deposited on the particle walls and then the coating is reacted with a cross-linking agent such as a diisocyanate to form a urethane type material. At best, however, the minimum thickness of the walls using this type of procedure is limited to about 0.1 micron. Similar techniques have been used to produce microencapsulated materials from polymers such as cyano-vinyl polymers, cross-linked cyano-ethyl cellulose polymers, and urea-formaldehyde.

SUMMARY OF THE INVENTION

The present invention is directed to a method and apparatus for providing a microencapsulated phosphor such as zinc sulfide-copper with improved moisture resistance properties. Other benefits are an enhanced light output of the excited particles and a change of the oleophilic surface properties to facilitate manufacture of the product.

In contrast to the prior art coacervation process, the method of the present invention is generally easier to carry out and is more repeatable.

In general, the method of the present invention involves vaporizing a poly-para-xylylene, pyrolyzing the resulting vapors to form reactive monomeric radicals, and passing the monomeric radicals to a vacuum deposition zone. In this vacuum deposition zone, particles of an electroluminescent phosphor are tumbled and are sifted while they are being tumbled. The reactive monomeric radicals are deposited on the particles to thereby cause the radicals to be absorbed and polymerized into a coating on the surfaces of the particles. The thickness of the coating is less than 0.1 micron and usually ranges from about 0.01 to 0.06 microns. The phosphor particles themselves usually have a mean diameter of from 5 to 50 microns.

The poly-para-xylylene compounds are available commercially under the name "parylene" which is generic to a family of poly-para-xylylene dimers having the following structure:

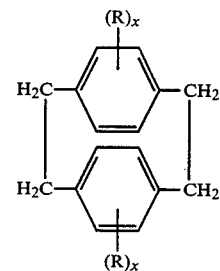

where $x = 0$ to $3$

R = alkyl, aryl, alkenyl, amino, cyano, carboxyl, alkoxy, hydroxyl alkyl, carbalkoxy, hydroxy, nitro, or a halogen.

The particularly preferred polymers for use in accordance with the present invention are parylene N ($x = 0$ in the formula), parylene C where R is a chlorine atom and x is equal to 1, and parylene D where R is a chlorine atom and x is equal to 2.

Upon pyrolysis these dimer compounds form linear polymers having a structure substantially as follows:

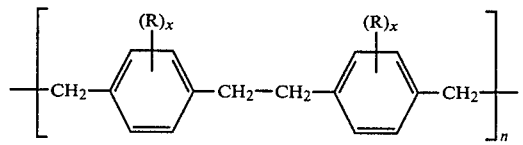

where $n = 10$ to $10,000$ or more.

There is a substantial amount of prior art on the deposition of parylene polymers and the following patents are representative of the prior art in this field, but the list is by no means comprehensive.

U.S. Pat. No. 2,712,532 to Szwarc et al. describes a process for the production of a solid polymeric product in which a mixture of vapors of at least two parylenes is pyrolyzed and the resulting vapors are cooled to a temperature at which a solid polymeric product is deposited.

U.S. Pat. No. 2,719,131 to Hall describes a process for the production of a parylene polymer by pyrolyzing a mixture of a gaseous p-xylene and chlorine, followed by cooling the pyrolyzed mixture.

In U.S. Pat. No. 2,769,786 to Szwarc et al. there is described a similar process for the production of polymers in the form of flakes, wherein the vapors are subjected to high temperatures in the presence of steam during pyrolysis.

In U.S. Pat. No. 3,288,728 to Gorham there is described a procedure for producing linear copolymers of parylenes by heating the dimer to a temperature between 450° and 700° C. for a time sufficient to cleave substantially all the dimer into vaporous p-xylene diradicals but insufficient to further degrade the diradicals, and at a pressure such that the partial pressure of the vaporous diradicals is below 1.0 torr.

Gorham et al. U.S. Pat. No. 3,300,332 describes a process which includes vaporizing and pyrolyzing a parylene to form the corresponding reactive diradicals and thereafter contacting the outer surface of the particle to be coated with the vaporous diradicals while maintaining the particles in constant and continuous motion so that fresh surfaces of the particles are exposed to the vaporous diradicals, while the particles are maintained at a temperature not greater than 200° C. to cause condensation and polymerization in situ on the particle surface.

U.S. Pat. No. 3,503,903 to Shaw et al. is directed to a process for improving the performance capabilities of the parylene polymers by terminating the reactive residual radicals in the freshly vapor deposited polymers with radicals having a more rapid reactivity with p-xylylene radicals than oxygen for a period of time sufficient to cause the electron spin resonance spectrum of the polymer to disappear.

Lobe et al U.S. Pat. No. 3,573,978 describes an after-treatment of the polymer which involves maintaining the coated substrate at a temperature of from 100° to 200° C. for at least 0.25 hour.

BRIEF DESCRIPTION OF THE DRAWINGS

A further description of the present invention will be made in conjunction with the attached sheet of drawings in which.

DESCRIPTION OF THE PREFERRED EMBODIMENTS

Figure 1:
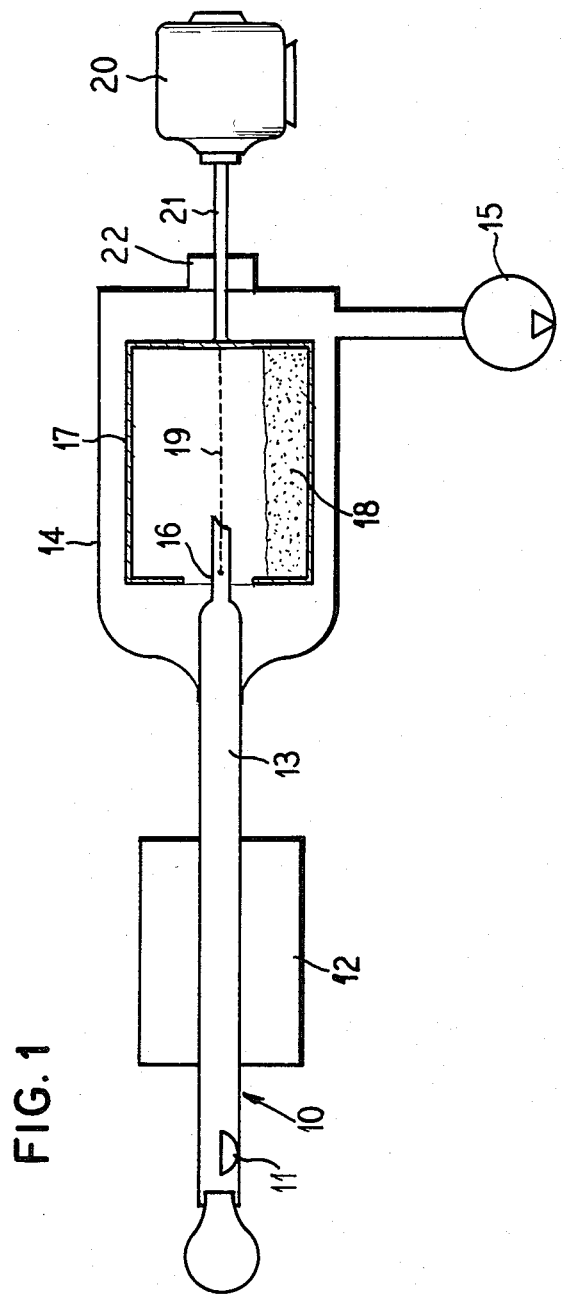
FIG. 1 is a somewhat schematic view illustrating a type of apparatus which can be used in the practice of the present invention.

In FIG. 1, reference numeral 10 indicates generally a refractory tube closed at one end and containing a boat 11 with a suitable xylylene dimer such as dichloro-dipara-xylylene. The dimer is volatilized in the tube 10 and passes to a pyrolysis furnace 12 which operates at a temperature of about 680° C. A pyrolysis tube 13 follows the furnace 12 and provides a reaction zone for converting the dimer to a reactive vapor of a highly reactive monomer.

The monomer is then transferred to a vacuum deposition zone including a housing 14 whose interior is evacuated to a low pressure on the order of 0.1 torr by vacuum pump 15. The tube 13 is necked down as indicated at reference numeral 16 and injects the highly reactive vapor monomer into a rotatable drum 17. The drum 17 is partially open at the end which receives the necked down portion 16 of the pyrolysis tube, so that it is in open communication with the vacuum conditions of the housing 14.

Disposed within the drum 17 is a supply of electroluminescent phosphors such as zinc sulfide containing copper as a dopant. These particles are shown at reference numeral 18 and typically have a mean diameter of about 5 to 50 microns. It should be understood that the present invention is applicable to any electroluminescent phosphor which upon excitation of an electric field emits ultraviolet, infrared, or visible light.

Also disposed in the interior of the drum 17 and rotatable therewith is a screen 19 which acts to sift the particles as they are being tumbled, and thereby prevents agglomeration and tends to maintain the initial particle size distribution.

The drum 17 is driven by means of a motor 20 having a shaft 21 extending into the housing 14 through a vacuum seal 22.

As the phosphor particles 18 are tumbled in the drum 17 and sifted through the screen 19, the active monomer present in the vacuum chamber is adsorbed on the surfaces of the particle and immediately polymerized into an extremely thin coating.

Figure 2:
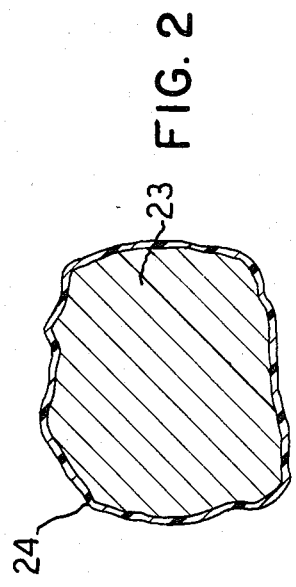
FIG. 2 is a greatly magnified view of a microencapsulated phosphor particle according to the present invention, the relative size of the coating being exaggerated for purposes of clarity.

The microencapsulated particle is shown in FIG. 2 and includes a core 23 of the phosphor material with a coating 24 composed of the linear polymer. The mean diameter of the core is about 5 to 50 microns with an average being about 20 microns. The microencapsulating coating is considerably thinner, being less than 0.1 micron in thickness and usually being in the range of 0.01 to 0.06 micron. Despite the extremely thin nature of the coating, the coating is evenly distributed and there is no room for water to collect and cause electrolysis resulting in the deposition of metallic zinc. The coated particles produced by the present invention exhibit coatings which truly conform to the surface and do not have a significant tendency to agglomerate. Apparently, the coating is formed on a molecule-by-molecule basis and provides excellent resistance to moisture penetration. Some secondary benefits of the present invention are an enhanced light output of the excited particles, and a change of surface properties which facilitate the manufacture of optical products from the electroluminescent phosphors.

It should be evident that various modifications can be made to the described embodiments without departing from the scope of the present invention.

We claim as our invention:

1. A method for microencapsulating an electroluminescent phosphor with an extremely thin coating which comprises:
   vaporizing a poly-para-xylylene,
   pyrolyzing the resulting vapors to form reactive monomeric radicals,
   passing said monomeric radicals to a vacuum deposition zone,
   tumbling particles of an electroluminescent phosphor in said deposition zone,
   sifting said particles during such tumbling to thereby maintain the original particle size distribution during deposition, and
   depositing said reactive monomeric radicals on said particles to cause said radicals to be adsorbed and polymerized into a coating on the surfaces of said particles.

2. A method according to claim 1 in which:
said poly-para-xylylene is dichloro-dipara-xylylene.

3. A method according to claim 1 in which:
said electroluminescent phosphor is zinc sulfide.

4. A method according to claim 1 in which:
said coating is less than 0.1 micron thick.

5. A method according to claim 1 in which: said coating is about 0.01 to 0.06 micron thick.

6. A method according to claim 1 in which the phosphor articles have a mean diameter of from 5 to 50 microns.

7. An apparatus for encapsulating particles of an electroluminescent phosphor which comprises:
 a vaporizing zone for vaporizing a poly-para-xylylene,
 a pyrolysis zone connected to said vaporizing zone,
 a rotary drum receiving reactive monomers formed in said pyrolysis zone, said rotary drum having discrete particles of said electroluminescent phosphor therein,
 a vacuum chamber surrounding said drum and communicating with the interior of said drum,
 a screen disposed within said drum to sift particles during rotation of said drum and tumbling of said particles, said screen having openings therein of a size arranged to maintain the original particle size distribution by the sifting action, and drive means for rotating said drum.

8. An apparatus according to claim 7 in which:
said screen is fastened to said drum and rotates therewith.

* * * * *